United States Patent [19]
Rippberger

[11] Patent Number: 5,375,539
[45] Date of Patent: Dec. 27, 1994

[54] EFFICIENT REMOVAL OF VOLATILE COMPOUNDS FROM SOIL OR WATER

[76] Inventor: Mark L. Rippberger, 3481 Skylark, Irvine, Calif. 92714

[21] Appl. No.: 935,406

[22] Filed: Sep. 21, 1992

[51] Int. Cl.⁵ .............................................. F23G 5/06
[52] U.S. Cl. .................................... 110/238; 166/303; 588/213; 34/86; 110/240
[58] Field of Search ............... 166/303, 252, 309, 302; 588/213, 214, 220, 230; 165/45; 299/5; 110/229, 236, 240, 238; 34/86; 123/1 A

[56] References Cited

U.S. PATENT DOCUMENTS

| | | | |
|---|---|---|---|
| 4,159,743 | 7/1979 | Rose et al. | 166/302 |
| 4,681,072 | 7/1987 | Pouring | 588/213 X |
| 4,839,061 | 6/1989 | Manchak, Jr. et al. | 588/213 X |
| 5,199,212 | 4/1993 | Newcomb | 110/240 |

*Primary Examiner*—Henry A. Bennett
*Attorney, Agent, or Firm*—Robert M. Wallace

[57] ABSTRACT

The invention is a highly efficient soil and/or water treatment system including its own power source, such as an internal combustion engine, in which heat from all heat sources and heat sinks is exchanged through a mutual heat exchanger circuit. The invention further includes a vacuum pulsation method for the in situ water or soil treatment, in which either or both (a) the pressure of the carrier gas pumped into the injection well and (b) the vacuum on the extraction well oscillate in time. The invention also includes a water treatment unit including a sparging bath with counterflowing sparging gas and a succession of sealed vertical water cells in which water flow is parallel and anti-parallel to the motion of sparging gas bubbles in alternate and remaining cells respectively. Condensation recovery of combustibles includes feedback to the power source for combustion thereof. Contaminated vapors are adsorbed onto a carbon mass and the desorbed vapors are fed back to the power source for combustion thereof or for recycling.

16 Claims, 10 Drawing Sheets

EFFICIENT REMOVAL OF VOLATILE COMPOUNDS FROM SOIL OR WATER

BACKGROUND OF THE INVENTION

1. Field of the Invention:

The invention is related to the removal of volatile contaminants, such as organic contaminants, from underground soil or water.

2. Background Art:

Various conventional techniques are used to cleanse soil or underground water of contaminants caused by underground pollution. Such contaminants are generally hydrocarbon or organic pollutants, although various chemical pollutants are extracted with the conventional techniques. One technique is in situ water treatment, in which an injection well and an extraction well are dug over the site of a polluted underground water table. The injection well is dug to a depth at or below the height of the water table. Heated air or carrier gas is pumped into the injection well, while a vacuum is applied to the extraction well. The heat and carrier gas causes the contaminants in the underground water to volatize out of the water and travel through the soil from the injection well to the extraction well, where the vacuum sucks the contaminants out as vapor. A related technique is in situ soil treatment, in which the injection well does not penetrate down to a water table, and the contaminants are principally volatized out of the soil between the injection and extraction wells.

Another technique is ex situ soil treatment, in which underground contaminated soil is drawn into a kiln, where it is heated and stirred. The heat volatizes the contaminants out of the soil in the kiln. A vacuum pump draws the volatized contaminants out of the kiln as vapor. The heated soil must be cooled upon exiting the kiln. A related technique is ex situ water treatment, in which underground contaminated water is sparged by passing it through a sparging tank in which a carrier gas is bubbled through the contaminated water. Contaminatants in the water are captured in the air bubbles, which are drawn off as a vapor by a vacuum as they reach the surface of the water in the tank. This process may be enhanced by heating the water upon entry into the sparging tank. To avoid thermal pollution, heated water must be cooled upon exiting the sparging tank.

The contaminants in the vapor created by each of these treatment techniques is recovered by condensing the contaminants therein into liquid form and also by carbon filtration. The condensing requires a refrigeration unit to cool the vapor. In carbon filtration, the carbon is regenerated by purging with a hot gas pumped through the carbon chamber, the gas exiting the carbon chamber containing contaminants. This gas itself may be purged by condensing the contaminants therein.

The disadvantage of the foregoing techniques is that they require large amounts of heat and power. The generation of such heat and power itself creates pollution, and furthermore consumes energy and is expensive. Thus, these conventional techniquese are inefficient, and their use is confined therefore to only those applications in which the amount of pollution justifies the penalties in energy consumption, cost and pollution. Thus, such techniques have been of limited use and application.

Accordingly, it is an object of the invention to provide in situ and/or ex situ soil and/or water treatment without the foregoing limitations in efficiency, particularly with regard to energy consumption and cost. It is a further object of the invention to reduce net amount of heat generated in a soil or water cleansing treatment.

SUMMARY OF THE INVENTION

The invention is a highly efficient soil and/or water treatment system including its own power source, such as an internal combustion engine, in which heat from all heat sources and heat sinks is exchanged through a mutual heat exchanger circuit. In the in situ treatment, a heat source is the power source providing power to the vacuum sources on the extraction well and to the pump for pumping carrier gas into the injection well, while a heat sink is the heat required to heat the carrier gas. In the ex situ treatment, a heat sink is the heat required to heat the incoming soil or water while an additional heat source is the heat drawn off in cooling the outgoing soil or water. In accordance with a novel feature of the invention, the incoming carrier gas is heated while the outgoing carrier gas is cool. Thus, in the ex situ treatment, another heat sink is the heat required to heat the incoming carrier gas while another heat source is the heat drawn off in cooling the outgoing carrier gas. In the contaminate recovery of the invention, a heat source is the heat drawn off in cooling the contaminated vapor for condensation, while a heat sink is the evaporator coils of the refrigeration unit. The condenser coil of the refrigeration unit is another heat source. In the carbon regeneration of the invenition, a heat sink is the heat required to heat the carbon regeneration gas.

The mutual heat exchanger circuit of the invention transports heat from the various heat sources to various ones of the heat sinks referred to above. The mutual heat exchanger circuit includes individual heat exchangers which exchange heat between nearest heat source/heat sink pairs, depending upon the layout of the apparatus. The topology of the heat exchanger circuit therefore necessarily varies depending upon the relative locations of the various components of the system, including the soil and/or water treatment units, the power source or engine, the contamination recovery unit and the carbon regeneration unit. For example, nearest heat sink/heat source pairs would be the heating and cooling coils of the incoming and outgoing soil or water in the ex situ treatment and the heating and cooling coils of the incoming and outgoing carrier gas. Preferably, therefore, such heating/cooling coils are located adjacent one another to comprise an efficient heat exchanger of the invention.

The invention further includes a vacuum pulsation method for the in situ water or soil treatment, in which either or both (a) the pressure of the carrier gas pumped into the injection well and (b) the vacuum on the extraction well oscillate in time. If both are made to oscillate, then they may oscillate either in phase or out of phase. The oscillation period of each may vary between several minutes and several weeks, depending upon soil conditions.

The invention also includes a hierarchical counterflow sparging process, in which the ex situ water treatment sparging bath is divided into sealed cells arranged in a vertically up-and-down serpentine path followed by the contaminated water in one direction. The sparging air flows through a ventilated pipe passing through all of the cells in the opposite direction. Sparging is carried on in each of the cells independently of the other cells, so that the contaminate level decreases cell-to-cell in the direction of the water flow. The advantage is that as the sparging gas flows through the successive cells and itself becomes contaminated, it does not affect the purer "downstream" cells, so that the purity of the final downstream cell is maintained. Each cell receives fresh sparging gas. The sparging gas is collected above each sparging cell in a common collection manifold.

Another feature of the sparging cells of the invention is that water flow in the vertically serpentine cells is parallel to the vertical rising of the sparging air bubbles in alternate cells and is anti-parallel thereto in the remaining cells. This feature provides the maximum contact between individual sparging bubbles and the pollutants they attract in the water.

DETAILED DESCRIPTION OF THE INVENTION

Figure 1:
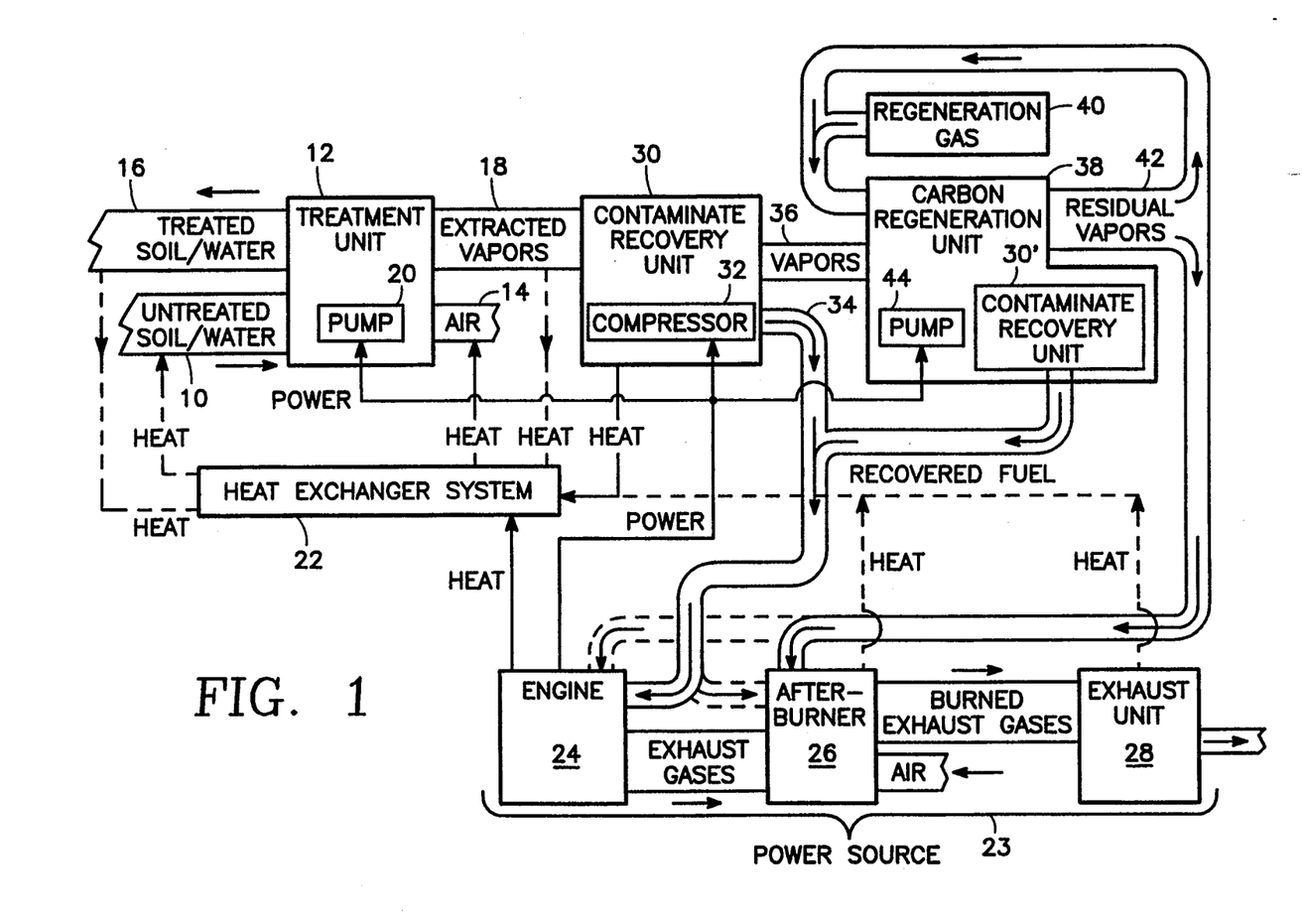
FIG. 1 is a system block diagram illustrating the overall architecture of the invention.

Referring to FIG. 1, untreated contaminated soil or water 10 enters a treatment unit 12 where the contaminants therein are removed by a carrier gas or air 14 injected into the treatment unit 12. The soil or water thus relieved of contaminants leaves the treatment unit 12 as treated soil or water 16. The carrier gas infected with the contaminants is drawn off and leaves the treatment unit 12 as extracted vapor 18. A pumping unit 20 includes pumps which pump in or impel the incoming untreated soil or water 10, pump in the carrier gas 14 and provide a vacuum to draw off the vapors 18. A heat exchanger in a mutual heat exchanger system 22 heats the incoming carrier gas 14. In some embodiments discussed below, the heat exchanger system 22 further includes other heat exchangers to heat the incoming untreated soil 10 and cool the outgoing treated soil 16 and to cool the extracted vapor 18.

An independent power source 23 provides the power to run the pump unit 20. The power source 23 includes a fuel-burning engine 24, such as an internal combustion engine or a steam engine, depending upon design choice. Its exhaust gases are burned in an after burner 26 and the burned exhaust gases from the after burner 26 are scrubbed in an exhaust unit 28 such as a catalytic converter. The heat exchanger system 22 receives heat from any one or all of the foregoing, including the engine 24, the afterburner 26 and the exhaust unit 28. Preferably, however, the heat is extracted by the heat exchanger system 22 at the the output of the exhaust unit 28 rather than the engine 24 or the after burner 26.

A contaminate recovery unit 30 receives the extracted vapors 18 from the treatment unit 12. Most of the contaminates are removed from the extracted vapors 18 by the contaminate recovery unit 30 through condensation. To this end, the contaminate recovery unit includes a refrigeration unit (not shown in FIG. 1) having a compressor 32 of the well-known type which facilitates a refrigeration cycle to cool the extracted vapor 18 to a liquid, the liquid being extracted as recovered fuel 34 in those cases in which the contamination in the soil or water 10 is organic, for example. The engine 24 powers the compressor 32 while the heat exchanger system 22 draws heat from the condensation coils (not shown) of the refrigeration unit.

In the embodiment of the invention illustrated in FIG. 1, the recovered fuel 34 is fed to the engine 24 as a fuel source for consumption thereby. This feature reduces the amount of external fuel sources consumed by the engine 24, thus enhancing the efficiency of the system.

The vapors remaining from the condensation process are removed from the contaminate recovery unit 30 as remaining vapors 36 to a carbon regeneration unit 38. The carbon regeneration unit 38 adsorbs the contaminants in the vapor 36 onto a carbon mass which is sequentially regenerated by pumping regeneration gas therethrough from a regeneration gas source 40 through the carbon which is not currently adsorbing. A portion of the residual vapors 42 drawn off of the carbon mass by the regeneration gas 40 are recirculated and mixed with the regeneration gas from the regeneration gas source 40, while the remainder are injected into the after burner 26 or the condenser in the contaminate recovery unit. Gas flow by the residual vapors 42 and by the regeneration gas is faciliated by a pumping unit 44 powered by the engine 24. The heat exchanger system 22 heats the regeneration gas from the regeneration gas source 40 with the recirculated residual vapors 42 upon their entry to the carbon regeneration unit 38.

Preferably, the carbon regeneration unit 38 includes its own internal contaminant recovery unit 30' of the same type as the contaminant recovery unit 30 (in which case the contaminant recovery unit 30 may optionally be dispensed with, depending upon system requirements). The internal contaminant recovery unit 30' operates in the manner described above with reference to the contaminant recovery unit 30 to furnish recovered fuel to the engine 24 or for recycling. The vapors produced by the internal contaminant recovery unit 30' are the residual vapors 42.

Figure 6:
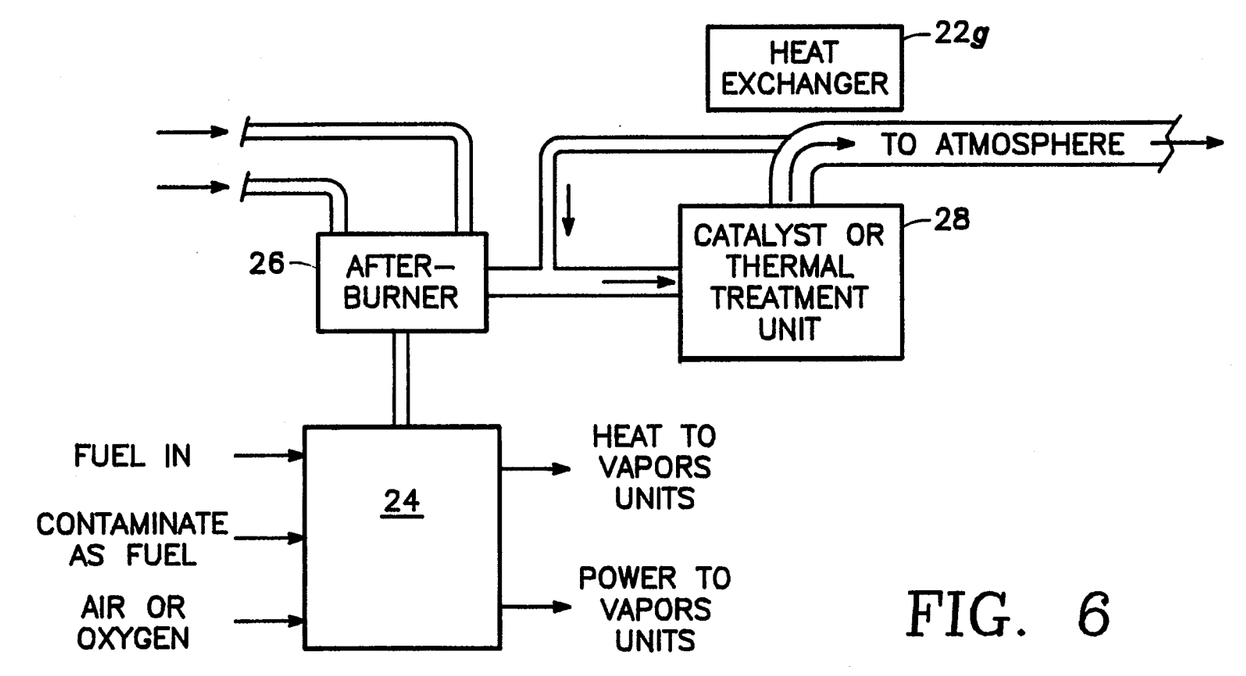
FIG. 6 is a schematic diagram of the power source in the system of FIG. 1.
Figure 7:
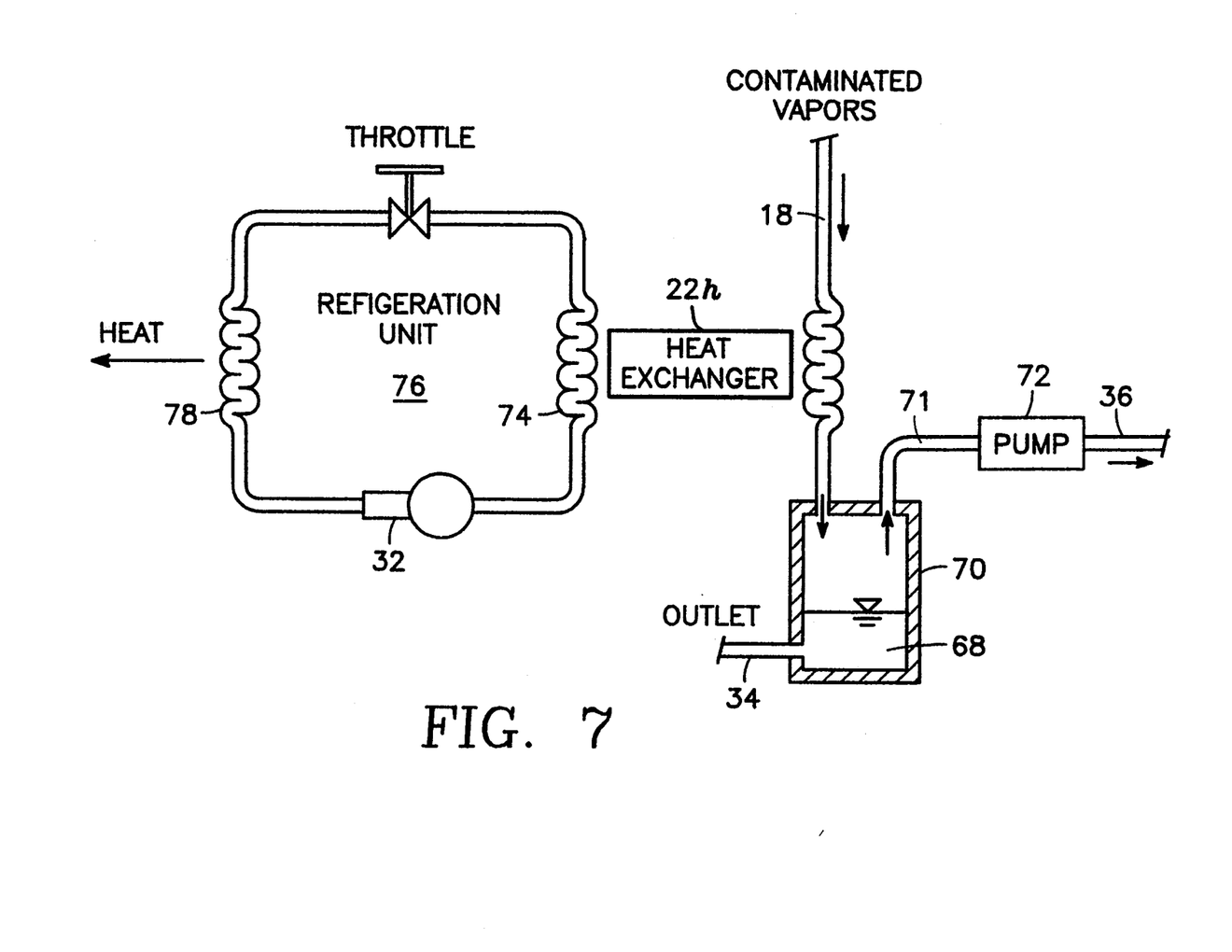
FIG. 7 is a diagram of the contaminant recovery unit 30 in the system of FIG. 1.
Figure 8:
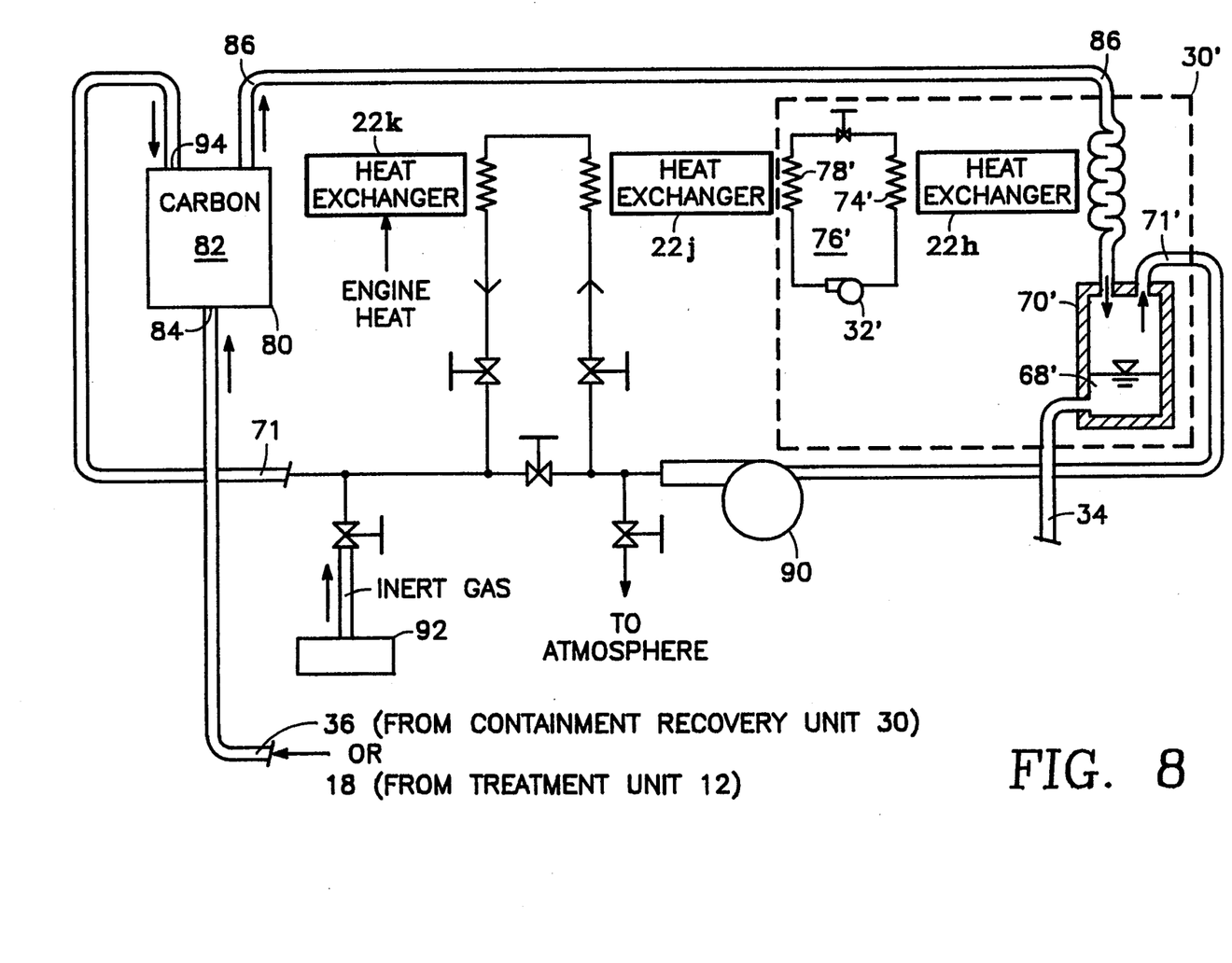
FIG. 8 is a diagram of the carbon regeneration unit in the system of FIG. 1.

The individual components of the system of FIG. 1 will now be described. Four different embodiments of the treatment unit 12 are illustrated in FIG.'s 2-5, the power source 23 is illustrated in FIG. 6, the contaminant recovery unit 30 is illustrated in FIG. 7 and the carbon regeneration unit 38 is illustrated in FIG. 8.

Figure 2:
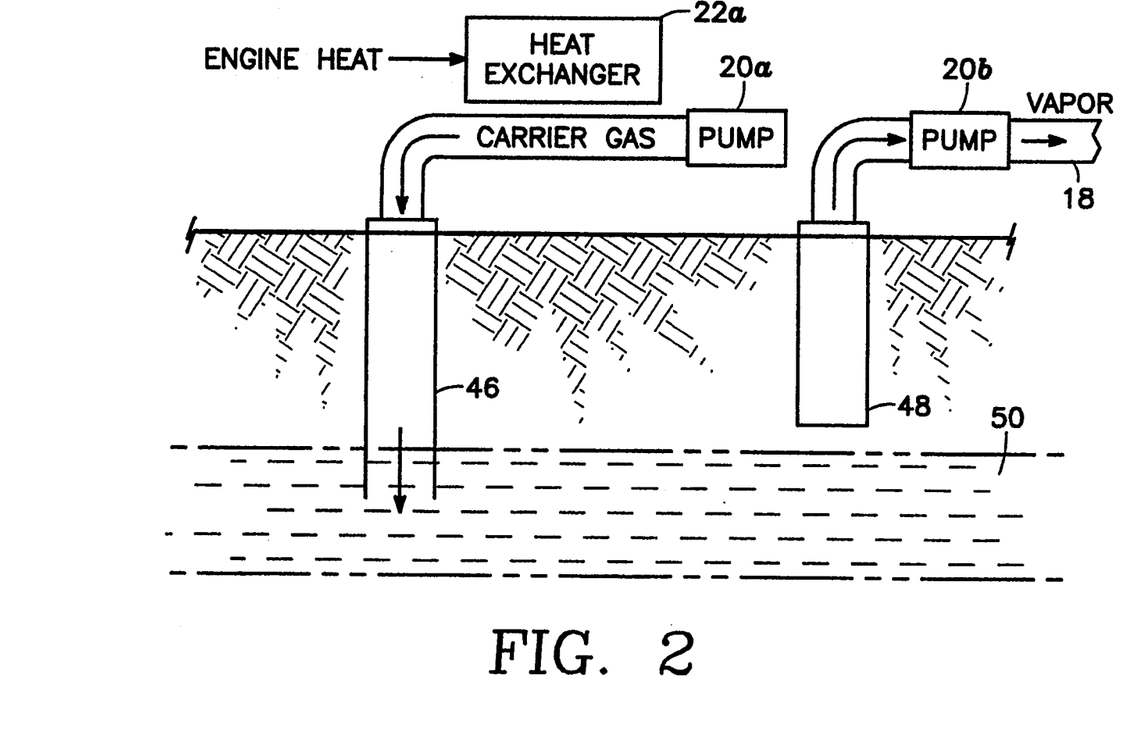
FIG. 2 is a diagram of the in situ water treatment in the system of FIG. 1.

The treatment unit 12 may be an in situ water treatment unit of the type illustrated in FIG. 2. In this case, treated and untreated water does not flow into and out of the treatment unit 12, as in FIG. 1. Instead a pair of wells is drilled over the location of the contaminated water table, namely an injection well 46 and an extraction well. The injection well is drilled down to the depth of the contaminated water table 50. A pump 20a pumps carrier gas 52 into the injection well 46 while a heat exchanger 22a receiving heat from the power source 23 heats the carrier gas 52 prior to its entry into the injection well 46. A pump 20b maintains a vacuum in the extraction well 48. The heat and carrier gas causes the contaminants in the water table 50 to volatize into the soil between the two wells 46, 48 and flow across the soil into the extraction well 48, where the pump draws them out as the extracted vapor 18. The pumps 20a, 20b are part of the pump unit 20 powered by the power source 23, while the heat exchanger 22a is part of the heat exchanger system 22 of FIG. 1.

Figure 3:
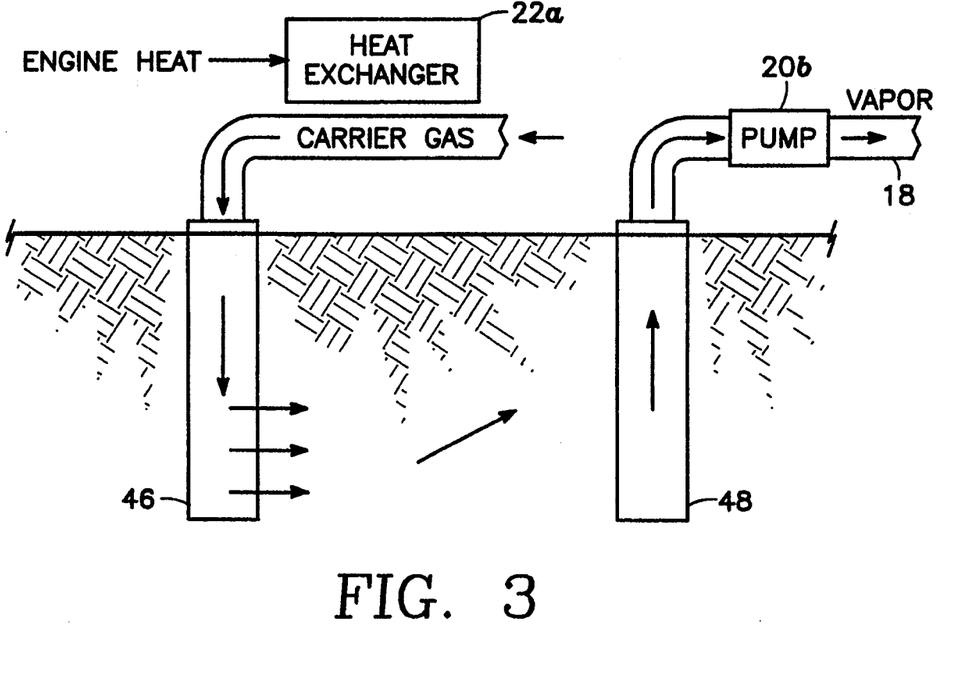
FIG. 3 is a diagram of the in situ soil treatment in the system of FIG. 1.

The treatment unit 12 of FIG. 1 may be the in situ soil treatment unit illustrated in FIG. 3. The main difference between the treatment units of FIG.'s 2 and 3 is that the injection well 46 of FIG. 3 does not extend down to the depth of a water table.

Figure 4:
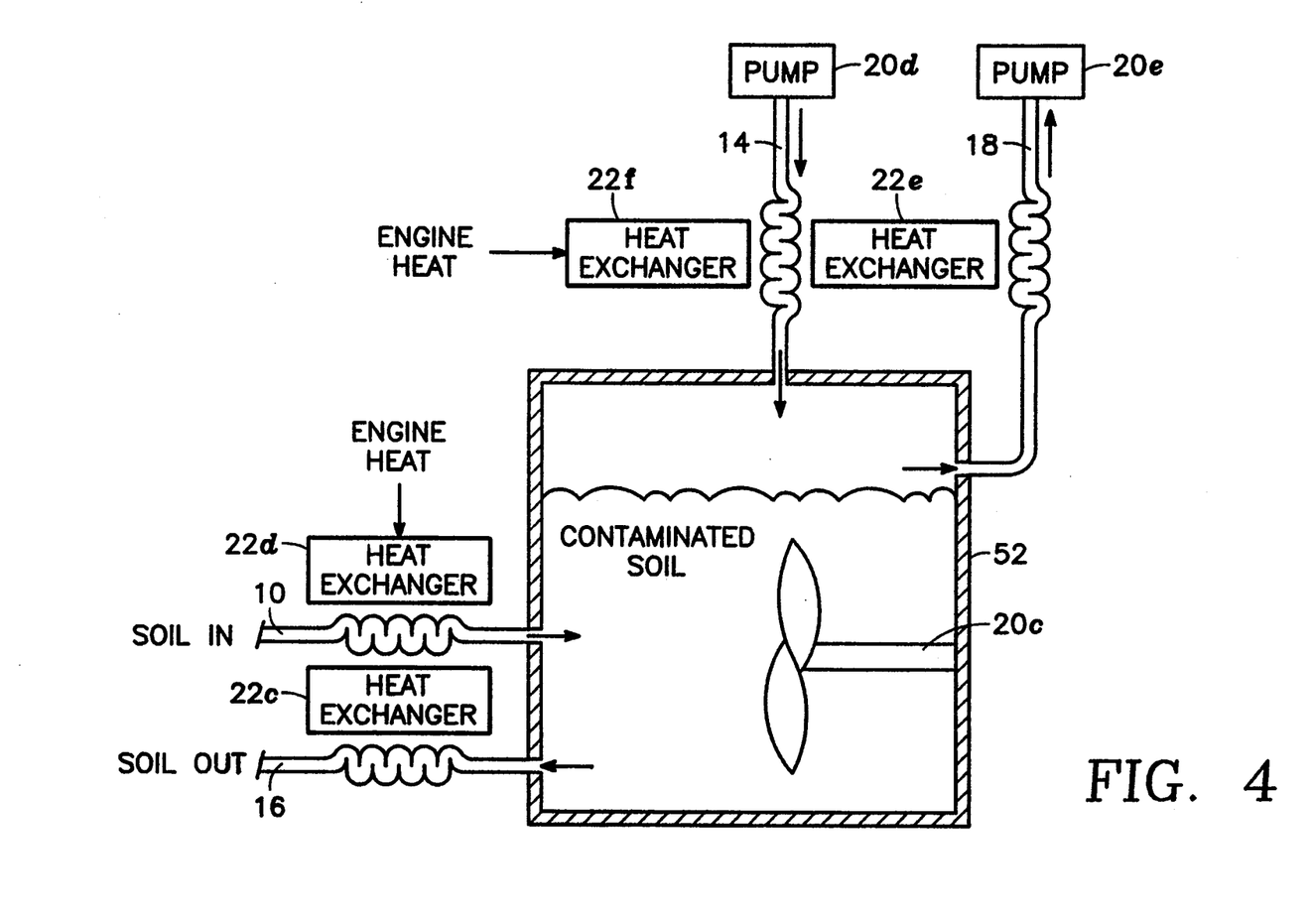
FIG. 4 is a diagram of the ex situ soil treatment in the system of FIG. 1.

The treatment unit 12 of FIG. 1 may be the ex situ soil treatment unit of FIG. 4. In this case, the pump unit 20 comprises an impeler 20c which draws the contaminanted soil 10 into a container 52 through an inlet and expels the treated soil 16 from the container 52 through an outlet. A heat exchanger 22c draws heat from the expelled treated soil 16 to the untreated incoming soil 10, while a heat exchanger 22d draws heat from the power source 23 to heat the incoming soil 10. A heat exchanger 22e draws heat from the extracted vapor 18 to heat the incoming carrier gas 14 injected by a pump 20d while a heat exchanger 22f draws heat from the power source 23 to heat the incoming carrier gas 14. The heat in the untreated soil 10 and the heated carrier gas 14 cause the contaminants to volatize, and they are drawn off by a pump 20e as the extracted vapors 18. The impeler 20c and the pumps 20d and 20e are powered by the power source 23, while the heat exchangers 22c, 22d, 22e, 22f are part of the heat exchanger system 22 of FIG. 1.

Figure 5:
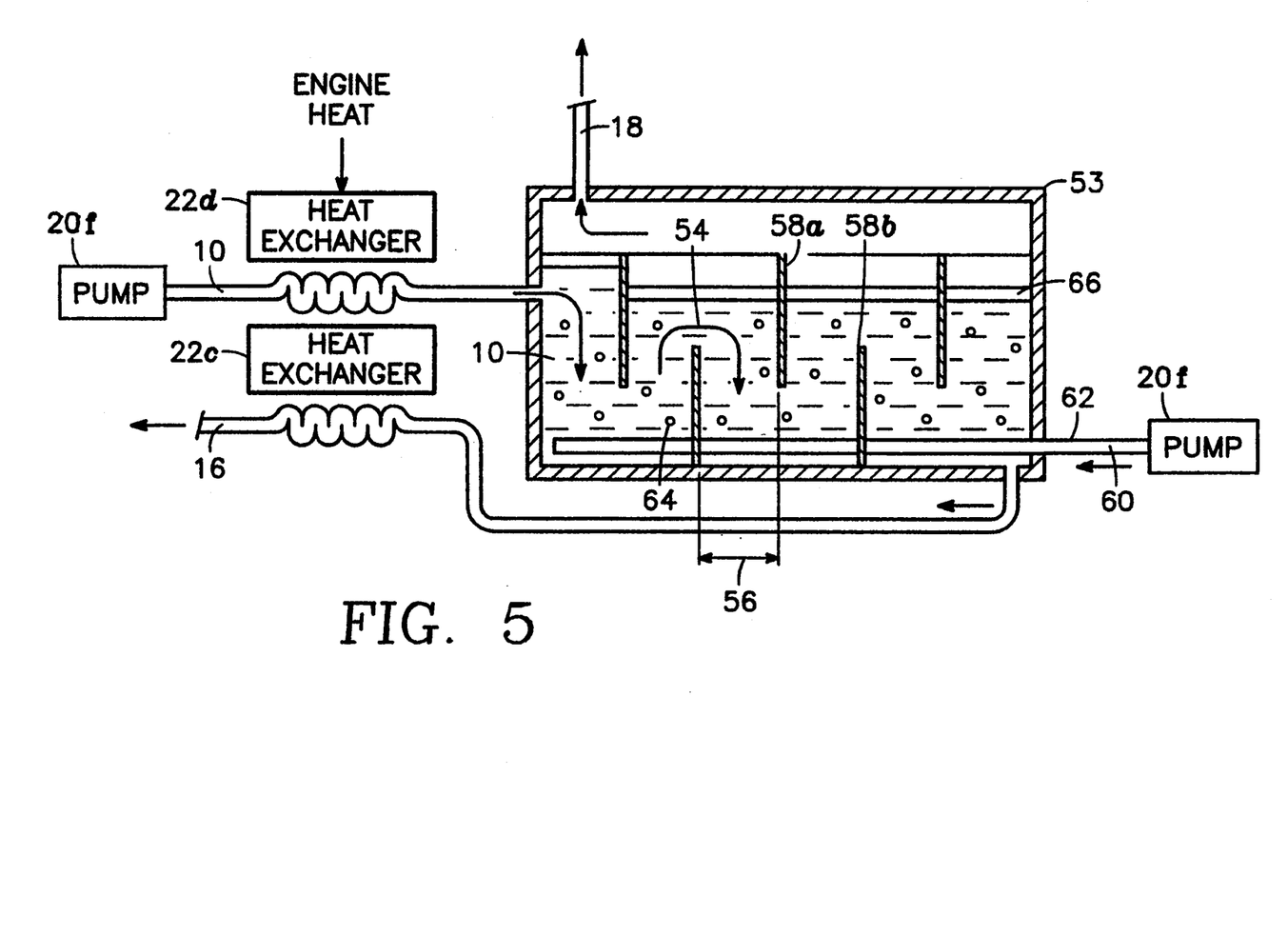
FIG. 5 is a diagram of the ex situ water treatment in the system of FIG. 1.

The treatment unit 12 of FIG. 1 may be the ex situ water treatment unit of FIG. 5. In this case the heat exchanger 22c is cooling outgoing treated water 16 while heating incoming untreated water 10, and the heat exchanger 22d is heating the incoming untreated water 10 from heat derived from the power source 23, in a manner similar to the operation described with reference to FIG. 4. The water treatment unit of FIG. 5 employs a gas sparging bath 53. The incoming water 10 flows through a vertically (with respect to gravity) serpentine path 54 among successive cells 56 separated by downward and upward-facing sealed walls 58a, 58b comprising interdigitated fingers. The horizontal direction of water flow is from left to right in FIG. 5. Sparging gas 60 is pumped into a sparging pipe 62 by a pump 20f in the opposite horizontal direction with respect to the water flow. The portion of the sparging pipe 62 within the sparging bath 53 has many closely spaced holes which allow the sparging gas to escape as bubbles 64 and float vertically upward in the bath 53. The height of the water surface 66 is slightly above the tops of the upward-facing walls 58b to guarantee water flow from one cell to the next while minimizing turbulent back-flow in a direction opposite to the left-to-right horizontal water flow. The water in the last cell (the right-most cell in FIG. 5) is drained out past the heat exchanger 22c as the treated water 16.

The sparging bath of FIG. 5 provides two principal features which enhance the process of contaminant transfer from the water 10 to the bubbles 64: First, the sealed cell walls prevent backflow of the water which may otherwise be caused by turbulence. Thus, each successive cell 56 contains water having a lesser contaminant concentration than the preceding cell (procedding from left to right in FIG. 5). Moreover, the contaminants introduced from the water 10 into the sparging pipe 62 are carried in the opposite direction (from right to left) by the pipe 62 to cells with higher contaminant concentrations, so that the pipe does not transfer contamination toward higher-purity cells (i.e., does not transfer contamination from left to right). This preserves the hierarchy of water contamination levels, in which contamination concentration decreases from left to right in FIG. 5. The second feature is that water flow through alteratate cells is parallel with the flow of the bubbles 64 (i.e., vertically upward) while water flow in the remaining cells is anti-parallel with the direction flow of the bubbles 64 (i.e., vertically downward). This feature enhances the transfer of contaminants in the water to the air in the bubbles 64, resulting in purer treated water 16.

Referring to FIG. 6, the power source 23 has a heat exchanger 22g drawing heat from the exhuast output of the exhaust unit 28. The heat exchanger 22g is part of the heat exchange system 22 and is in thermal communication with or is part of the heat exchangers 22a, 22d and 22f. The air supply to the after burner enhances the afterburning process to produce more completely burned gases and more heat for the heat exchanger 22g.

Referring to FIG. 7, the contaminant recovery unit 30 includes a heat exchanger 22h for cooling the incoming extracted vapors 18, so that they condense into a liquid 68 at the bottom of a condensation tank 70. Vapors 71 in the top of the tank 70 are extracted by a pump 72 as the remaining vapors 36, while the liquid 68 is extracted as the recovered fuel 34 at least in those cases in which the contamination is organic. The heat sink for the heat exchanger 22h is the evaporator coil 74 of a refrigeration unit 76 including the compressor 32 and a condenser coil 78. Preferably, heat from the condenser coil is drawn away by the heat exchanger system 22.

Referring to FIG. 8, the carbon regeneration unit 38 includes a container 80 containing a carbon core 82 of the type well-known in the art. An inlet 84 of the container 80 is connected to receive the remaining vapors 36 from the contaminate recovery unit 30 in the embodiment of FIG. 1. In an alternative embodiment, the inlet 84 is connected directly to the treatment unit 12 to receive the extracted vapor 18, so that the contaminate recovery unit 30 is not employed. The carbon core 82 adsorbs contaminants from the incoming vapors (18 or 36). Extraction vapors 86, which contain whatever contaminants were not adsorbed by the carbon 82, are pumped out of the container 80. In the preferred embodiment of the invention, the extraction vapors 86 are treated by an internal contaminate recovery unit 30' identical to the external contaminate recovery unit 30 described above with reference to FIG. 7. In this embodiment, the extraction vapors 86 from the carbon container are cooled by the heat exchanger 22h' so as to condense into a liquid 68' at the bottom of the condensate container 70', to be drawn off as the recovered fuel 34. The heat exchanger 22h' dumps the heat from the extracted vapors 86 to the evaporator coil 74' of the refrigeration unit 76'. The vapors 71' in the top of the tank 70' are recirculated by a pump 90 and combined with fresh regeneneration gas 92 for injection into a regeneration gas inlet 94 of the carbon container 80. A heat exchanger 22j draws heat from the condenser coil 78' to heat the recirculated vapor 71. A heat exchanger 22k draws heat from the power source 23 to further heat the recirculated vapor 71. The heat exchanger 22k of FIG. 8 is in thermal communication with the power source exhaust heat exchanger 22g.

The heat exchangers 22a–k comprising the heat exchanger system 22 are conventional heat exchangers of the type well-known in the art.

In one alternative embodiment, the residual vapors 42 are fed back to either the carbuerator of the engine 24 (if they are organic) or to the afterburner 26 if they are chloronated or corrosive. In another alternative embodiment, the recovered liquid 68 or 68' is either corrosive or chloronated, in which case it is fed to the afterburner 26 rather than to the engine 24. In either of these alternative embodiments, the recovered material enhances system efficiency by providing either power (when fed back to the engine 24) or heat (when fed back to the after burner 26) or both.

Figure 9:
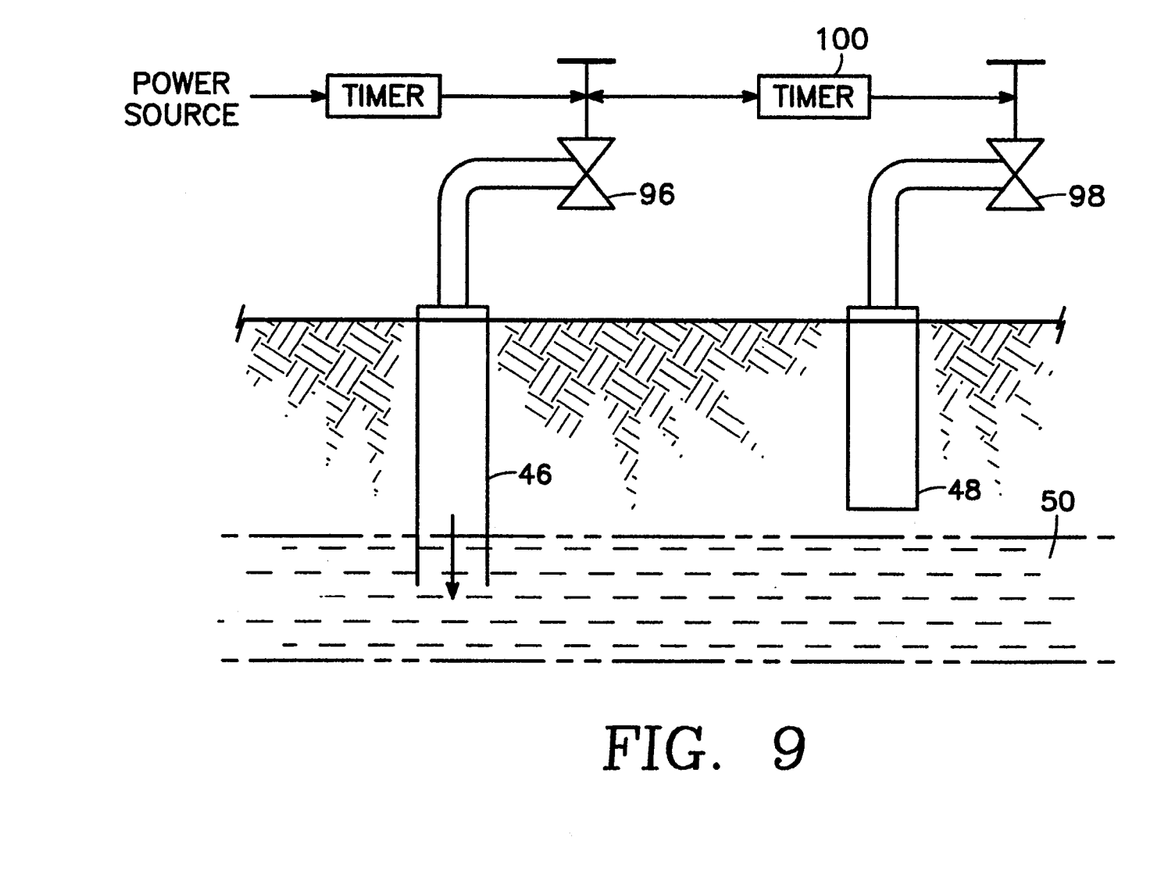
FIG. 9 is a diagram illustrating the pulsation treatment employed in the treatment processes of FIG.'s 2 or 3.

Referring to FIG. 9, the pulsation treatment employed in the embodiments of FIG. 2 and/or FIG. 3 includes an automated pneumatic valve 96 at the inlet to the injection well 46 and a pneumatic valve 98 at the outlet of the extraction well 48. A timer 100a, 100b (which may be integrated as a single timer) controls the valves 96, 98. The valve 96 controls the pressure at which the carrier gas 14 is injected while the valve 98 controls the vacuum with which the vapors 18 are extracted. The volatization and extraction of contaminated vapors is enhanced by opening and closing the valves 96, 98 in oscillating fashion. The vacuum pulsation of the valve 98 may be performed either alone or in conjunction with pulsation of the valve 96 to turn the valve 98 on and off at a cyclic rate. If performed alone, the vacuum pulsation of the valve 98 may be performed at a cyclic rate of between several minutes and several weeks, depending upon the soil conditions. If performed together, the valves 96, 98 may be turned off and on synchronously (in phase) or asynchronously (out of phase).

Figure 10A:
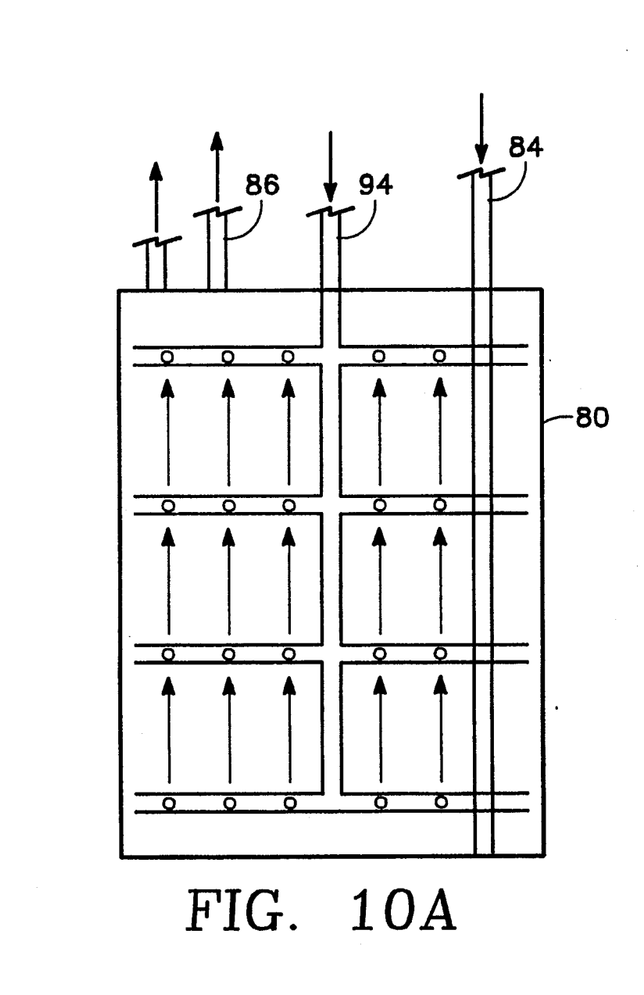
FIGS. 10A and 10B are top and side cut-away views, respectively, of the preferred carbon regeneration vessel employed in the embodiment of FIG. 8.
Figure 10B:
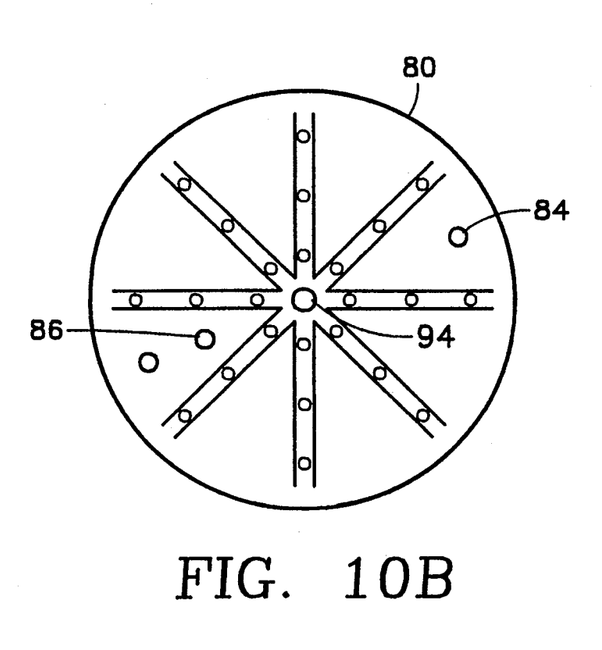

Referring again to FIG. 8, the carbon regeneration unit 80 is preferably a vessel with heat dispersion plumbing shown in the side and top cut-away views of FIGS. 10A and 10B, respectively. The purpose of the heat dispersement system is to decrease the time it takes to heat the pore space and carbon surface in the carbon bed, thereby accelerating the regeneration process. If heat is injected into only one end of the carbon bed, heat will be spent in heating the mass of carbon at the remaining surface at the discharge end. This system heats each section of the carbon bed simultaneously. In addition, cool down is quicker as well, thus enabling carbon to be regenerated more quickly. This means smaller beds may be used with large mass flows of contaminates.

The inert (non-combustible, non-oxidizing) gas for carbon regeneration is desirable to prevent combustion of the carbon and adsorbed hydroarbons. The inert gas can be obtained from the engine exhaust which is a mixture of nitrogen, CO2 and trace gasses. Thus, no external source is needed. Steam may also be generated form the heat sorce for use as a regeneration gas.

Although FIG. 1 illustrates a single treatment unit 12, it should be understood that the treatment unit 12 may comprise plural treatment units selected from various ones of the treatment units of FIG.'s 2, 3 4 and 5. Moreover, the external contaminate recovery unit 30 may be eliminated, particularly if the internal contaminate recovery unit is present in the carbon regeneration unit 44.

While the invention has been described in detail by specific reference to preferred embodiments thereof, it is understood that variations and modifications may be made without departing from the true spirit and scope of the invention.

What is claimed is:

1. Apparatus for efficiently removing volatile underground contaminants, comprising:
    a treatment unit for extracting vapors containing said underground contaminants;
    a contaminate recovery unit comprising means for condensing said vapors to produce a recovered liquid;
    power source means comprising a combustion engine for furnishing power for apparatus; and
    means for transporting said recovered liquid to said power source for combustion thereof.

2. Apparatus for efficiently removing volatile underground contaminants, comprising:
    a treatment unit for extracting vapors containing said underground contaminants;
    power source means comprising a combustion engine for furnishing power for apparatus; and
    means for adsorbing contaminants in said vapor onto a carbon mass, means for extracting residual vapors from said carbon mass containing ones of said contaminants and means for transporting said residual vapors to said power source for combustion thereof.

3. Apparatus for efficiently removing volatile underground contaminants, comprising:
    a treatment unit for extracting vapors containing said underground contaminants comprising means for injecting a carrier gas to mix with said contaminants and create said vapors and means for heating said carrier gas and means for withdrawing said vapors;
    power source means comprising a combustion engine for furnishing power to run said means for injecting and to run said means for withdrawing; and
    wherein said means for heating said carrier gas comprises a first heat exchange circuit which conducts heat from said engine to said carrier gas, whereby heat generated in powering said means for injecting and said means for withdrawing heats said carrier gas.

4. The apparatus of claim 3 wherein said treatment unit further comprises means for cooling said vapor comprising a second heat exchange circuit which conducts heat from said vapor to said carrier gas.

5. The apparatus of claim 3 wherein said treatment unit further comprises a kiln and means for injecting untreated contaminated soil into said kiln and means for ejecting treated soil from said kiln, means for heating said untreated soil and means for cooling said heated soil, wherein said means for cooling comprise a third heat exchange circuit which conducts heat from said treated soil to said untreated soil and wherein said means for heating said untreated soil comprise a heat exchange circuit which conducts heat from said power source to said untreated soil.

6. The apparatus of claim 3 wherein said treatment unit comprises a sparging bath for cleaning contaminated water, said sparging bath comprising:
    means for defining a water path in a first direction through a succession of sealed water cells, wherein said contaminated water flows from a first one of said cells to a last one of said cells through intervening ones of said cells;

counterflow means for transporting said carrier gas through said succession of cells beginning with said last cell and ending with said first cell while releasing said gas as bubbles into said succession of cells.

7. The apparatus of claim 6 wherein said means for defining comprise means for establishing said water path in a direction parallel to flow of said bubbles in alterate ones of said cells and for establishing said water path in a direction antiparallel to flow of said bubbles in remaining ones of said cells.

8. The apparatus of claim 7 wherein said means for establishing comprises first and second vertical interdigitated sets of water-tight walls between said cells, wherein said water has a surface level slightly above a lower one of said first and second vertical interdigitated sets of water-tight walls.

9. The apparatus of claim 3 further comprising a contaminate recovery unit comprising means for condensing said vapors to produce a recovered liquid, comprising means for transporting said recovered liquid to said power source for combustion thereof.

10. The apparatus of claim 9 wherein said means for condensing comprises a refrigeration unit in thermal contact with said vapors, said apparatus further comprising a heat exchanger circuit which conducts heat from said vapor to an evaporation coil of a refrigeration unit.

11. The apparatus of claim 3 further comprising means for adsorbing contaminants in said vapor onto a carbon mass, means for extracting residual vapors from said carbon mass containing ones of said contaminants and means for transporting said residual vapors to said power source for combustion thereof.

12. The apparatus of claim 11 wherein said means for adsrobing contaminants further comprises means for blowing a regenerating gas across said carbon mass to produce said residual vapors, means for heating said regenerating gas and a heat exchanger circuit for drawing heat from said power source to said regenerating gas.

13. The apparatus of claim 12 wherein said regenerating gas comprises a recirculated portion of said residual vapor.

14. The apparatus of claim 12 further comprising means for condensing at least a portion of said residual vapor to a liquid including a refrigeration unit, wherein said heat exchanger circuit further draws heat from said refrigeration unit.

15. The apparatus of claim 3 wherein said means for injecting comprises means for creating a pressure in an underground injection well and said means for withdrawing comprises means for holding a vacuum in an underground extraction well, said apparatus further comprising:

first means for periodically modulating said vacuum.

16. The apparatus of claim 15 further comprising second means for periodically modulating said pressure, wherein said first and second means for modulating operate synchronously one of (a) in phase and (b) out of phase with one another.

* * * * *